May 29, 1934.  C. F. STRONG  1,960,683
BOOSTER CONTROL
Filed March 8, 1930  2 Sheets-Sheet 1

INVENTOR
Chester F. Strong
BY
Edward W. Hathaway
ATTORNEY

May 29, 1934.  C. F. STRONG  1,960,683
BOOSTER CONTROL
Filed March 8, 1930  2 Sheets-Sheet 2
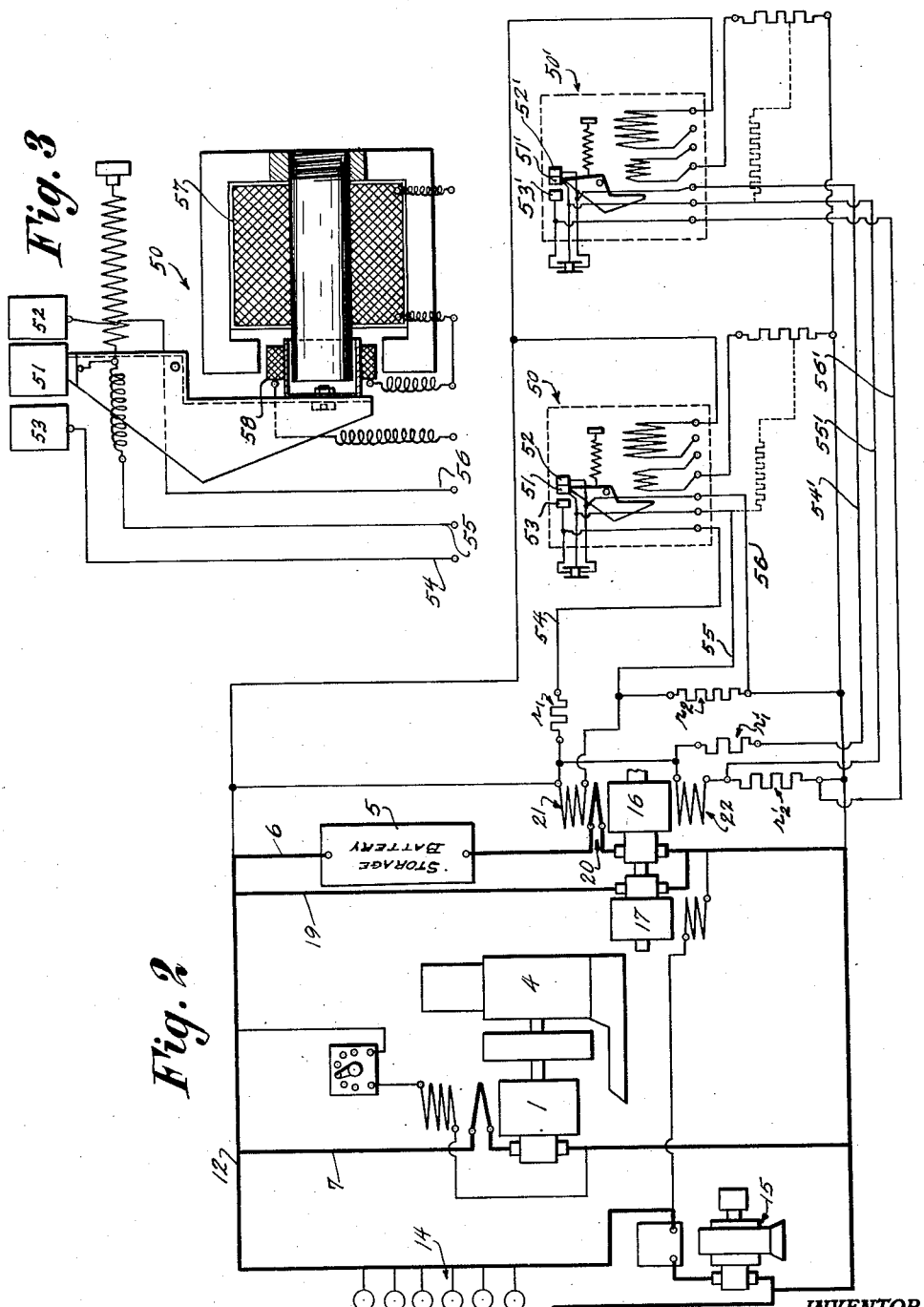

Patented May 29, 1934

1,960,683

UNITED STATES PATENT OFFICE 1,960,683

BOOSTER CONTROL

Chester F. Strong, Miami, Fla.

Application March 8, 1930, Serial No. 434,281

13 Claims. (Cl. 171—314)

This invention relates to voltage control apparatus and particularly to an improved battery booster. An object of my invention is to provide an improved control arrangement for a battery booster and especially an arrangement for effecting very close and smooth voltage regulation during relatively quick changes in load whether of large or small magnitude. A further object is to provide an improved control adapted to effect, what is termed herein, a gradual shifting or differential action between certain of the booster control fields in accordance with load changes. Specifically the fields of my improved control are two shunt fields with one tending to counterbalance the other when the booster is inactive, but adapted upon quick changes in load to be so relatively adjusted as to follow the load changes equally quickly and yet smoothly, thereby obtaining very desirable regulation.

A further and more specific object is to provide an improved relay control which is particularly adapted to control a battery booster for a prime mover electrical generating unit using an internal combustion engine, preferably of the Diesel type, the unit being used especially for service which does not require constant operation. For example where it is desired to provide a small generating plant in a hotel, apartment house, office building or other similar place to take care of the electrical power needs thereof, there may be periods of time with no load during which the unit is shut down. Suddenly an elevator load may be thrown on, requiring not only the supply of initial current demands for the elevator, but also a temporary supply of current to the generator which is adapted to act as a motor to drive the engine for starting same. Such an arrangement forms the subject matter of one of my copending applications. When the engine starts then the generator supplies current for the elevator or other load. In the preferred specific embodiment of the invention these results are accomplished by using with the field arrangement vibrating relays although it is clear that relay controls of types other than vibrating ones, e. g., carbon piles, can be used instead so as to give the gradual variation in field current.

It is seen from the foregoing that the conditions of operation under which my improved booster control operates, requires a high degree of flexibility and smoothness and quickness of operation to maintain constant voltage. The demand for practically constant voltage is most exacting in the above types of building installations, for not only must current be supplied for power purposes but also for domestic uses such as lighting. Any flickering of the lights, during starting or operation of the elevators or other power loads would make the use of the power plant impractical.

The ability of the specific forms of my improved booster arrangement and any modifications thereof to meet the above exacting conditions will be readily apparent to those skilled in the art from the following description of the accompanying drawings in which:

Fig. 2 is a modified form of control, and

Fig. 3 is an enlarged schematic view of the vibrating relay used in the modified form.

Figure 1:
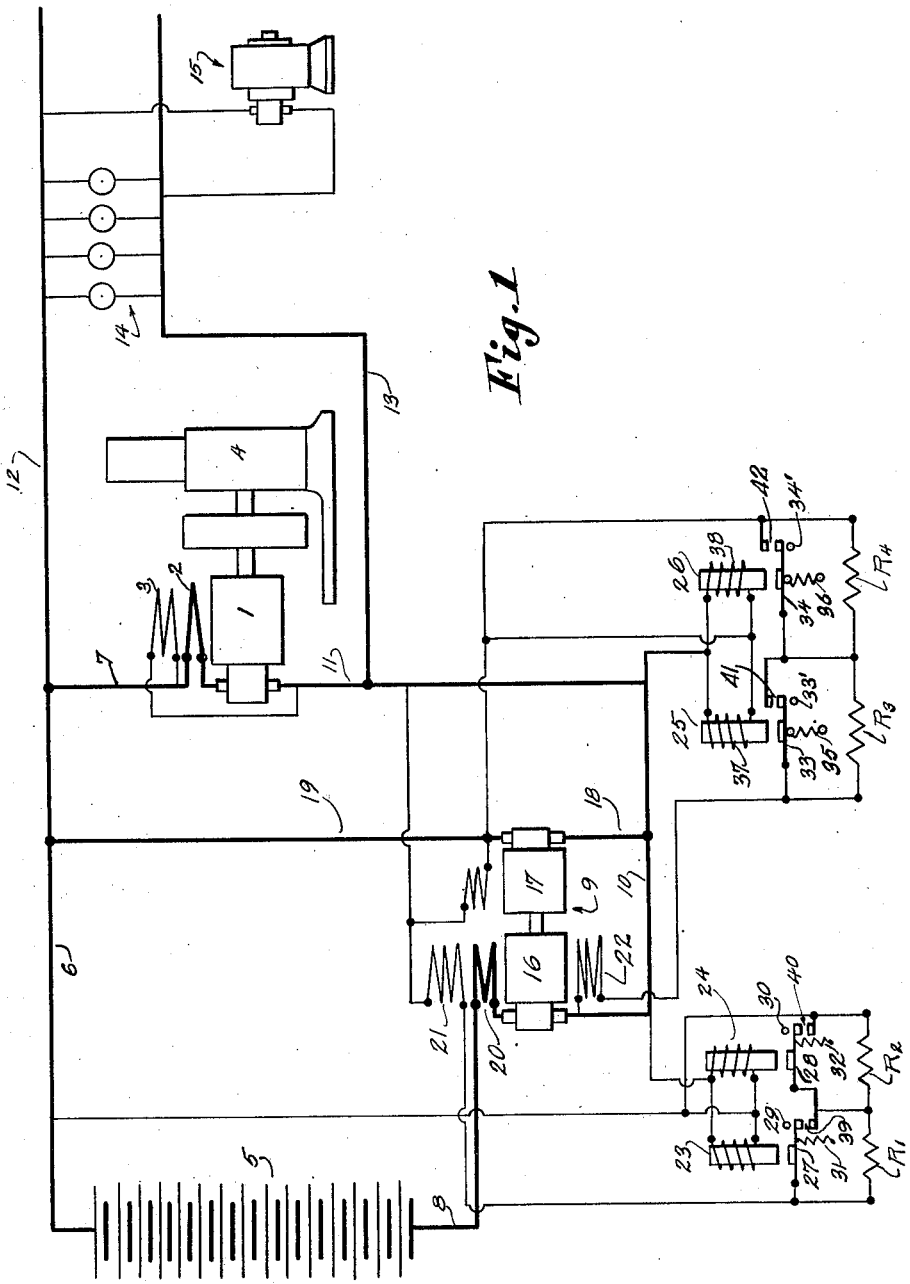
Fig. 1 is a wiring diagram of my improved booster control applied to a Diesel generator unit adapted for an installation such as above specified.

In the drawings a direct current generator 1 having a usual series field 2 and shunt field 3, is driven by a prime mover 4 of the internal combustion engine type, preferably a Diesel engine. The engine is provided preferably with any usual type of speed governor control so as to maintain substantially constant speed with varying load although it is possible to permit the usual small percentage of speed variation between no load and full load.

A storage battery 5 is connected to one terminal of the generator through wires 6 and 7 and series field 2 and to the other generator terminal through wire 8, booster set 9, and wires 10 and 11. The battery and generator 1 are in parallel through booster 9 and connected to supply current mains 12 and 13 to any domestic load represented at 14 or power load indicated at 15.

The booster set comprises a booster generator 16 whose armature is in series with leads 8 and 10 and is driven by a motor 17 supplied with current through wires 18 and 19 from wires 6 and 10.

The booster generator has a compound series field 20 and shunt fields 21 and 22 of opposed polarity and which are simultaneously equally excited when the booster is inactive so that they neutralize one another. When shunt field 21 is excited so as to develop more ampere turns than shunt field 22, the booster armature 16 has its voltage added to the voltage of battery 5. When shunt field 22 is excited so as to develop more ampere turns than shunt field 21 then the voltage of booster armature is opposed to the battery voltage and adds its voltage to that available across mains 6 and 10.

To control the excitation of the respective shunt fields there is connected in series with shunt field 21 resistances $R_1$ and $R_2$ controlled through vibrating relays 23 and 24. Likewise in series with shunt field 22 are resistances $R_3$ and $R_4$, controlled by vibrating relays 25 and 26. Relays 23 and 24 have their armatures 27 and 28 held against stops 29 and 30 by pull of their coils 33 and 34 against the tension of springs 31 and 32 when the line voltage is normal. During this time the battery may be and usually is charging. Relays 25 and 26 have their armatures 33 and 34 held by springs 35 and 36 against stops 33' and 34' when coils 37 and 38 are energized by slightly less than normal line voltage.

Under the above conditions when all relays are inactive, shunt fields 21 and 22 have resistances $R_1$, $R_2$ and $R_3$, $R_4$ in series with them respectively, so that the ampere turns of one field neutralizes the ampere turns of the other. However, upon any initial tendency for the voltage across mains 12 and 13 to fall, due to excessive loads at 14 or 15, or for any other reason, armature 27 of relay 23 is caused to vibrate thereby intermittently closing contacts 39 and shunting out resistance $R_1$. A further slight drop in voltage causes vibration of armature 28 and consequent intermittent closure of contacts 40 whereby resistance $R_2$ is shunted out. Relay 23 is adjusted so that contacts 39 remain closed, or substantially so, before relay 24 begins intermittent closure of contacts 40.

The action of booster 16 under the above conditions is that shunt field 21 has more ampere turns than field 22 and accordingly the booster voltage is added to that of battery 5 which is discharging to assist in carrying load on mains 12 and 13. Substantially constant line voltage is thus obtained as long as the discharge requirements are within the capacity of battery 5 and booster set 9.

When the voltage across mains 12 and 13 is normal, armature 33 vibrates and intermittently closes contacts 41, thereby shunting out resistance $R_3$. Under this condition relays 23 and 24 have their armatures pulled against stops 29 and 30. Therefore the ampere turns in field 22 exceeding those in field 21 cause voltage of booster 16 to be added to the line voltage across mains 12 and 13. This is sufficient to charge battery 5. If for any reason there is a further increase in voltage across mains 12 and 13, armature 34 then vibrates to close intermittently contacts 42 thus shunting resistance $R_4$ and further increasing the ampere turns of shunt field 22 to raise further the voltage of booster 16 whereupon battery 5 has a higher voltage impressed across its terminals.

The action of series field 20 is to furnish sufficient ampere turns to compensate for the resistance drop of the machine when the current is flowing through the armature in either direction. If desired it may have more ampere turns than is necessary for resistance drop alone.

From the foregoing description it is seen that the shunt fields and relays are such that the ampere turns are smoothly shifted from charging, through neutral to discharging or vice versa, or from neutral to either side. This shifting action also may be as rapid or slow as the change in load requires without any abruptness in the voltage regulation.

The percentage of compounding on the booster preferably is of such a nature that it just compensates for the internal voltage drop of the machine or is so proportioned as to take care of the resistance drop of the battery but not the polarization drop thereof. To take care of the polarization drop as well as the internal voltage drop in the machine the series ampere turns may be about 20-40% of the ampere turns of either shunt field alone or under certain conditions of operation the series field may be omitted.

Figs. 2 and 3 show the same system of booster control as in the preferred form but with a different type of vibrating relay. This single relay device is the equivalent of the two vibrating relays shown in Fig. 1, e. g. 23, 24. It is a standard type of relay and hence a specific detailed description or disclosure of its structure and operation need not be given except to point out its relation to my improved system. For simplicity, similar elements of the two forms are given the same reference character. The discharge shunt field of the booster is indicated at 21 while the modified form of relay therefor is shown at 50. This relay has a vibrating contact 51 and stationary contacts 52 and 53. When contact 51 is against contact 53 it is shunting resistance $r_1$ around field 21 as by wires 54 and 55. Inasmuch as resistance $r_2$ is in series with field 21, when resistance $r_1$ is shunted around the field, minimum current is flowing thru field 21. In operation, any fall in line voltage below the value for which relay 50 is adjusted, causes contact 51 to begin vibrating against contact 53 thereby intermittently cutting out resistance $r_1$ and shunting a less amount of current around field 21. Any further slight fall in line voltage causes contact 51 to swing over to vibrate against contact 52, thereby shunting resistance $r_2$ as by wires 55, 56. As this resistance is normally in series with field 21 it is seen that cutting out of resistance $r_2$ increases the current in field 21 to such a value that booster 2 maintains the line voltage substantially constant by boosting the voltage of battery 5 to that desired on the lines 12 and 13.

Shunt field 22 is controlled by a similar relay 50' and resistances $r_1'$ and $r_2'$. In this case a light load on generator 1 would permit it to maintain a line voltage across mains 12 and 13 at least normal or possibly slightly more than normal. Under such conditions contact 51 of relay 50 would be against contact 53 while contact 51' of relay 50' would be vibrating against contacts 53' or 52' in such manner as to maintain the desired charging voltage on storage battery 5. When relay 50' is operating, contacts 51 and 53 on relay 50 will be normally closed and when relay 50 is operating, contacts 51' and 52' on relay 50' will be normally closed. When relay 50' is operating it is seen that the resistances $r_1'$ and $r_2'$ will permit successive variations in the field strength in the same manner as described with field 21, except of course that field 22 is controlled in accordance with increases above normal of the line voltage.

The electro-magnets 57 and 58 for effecting vibration of the movable contact is arranged both mechanically and electrically, as is well understood, so as to be responsive to increases in voltage. By suitably adjusting the respective relays for the shunt fields they are adapted for being responsive to either increases or decreases of line voltage as above explained. It is thus seen that with this form of relay as well as with the other, a smooth control and variation of the opposed fields is obtained. It is of course understood that if desired the preferred form of relay may be used for one shunt field and the last described form with the other shunt field, the mode of operation of each form of relay being the same as described herein. Another modification of my improved booster arrangement is described in my co-pending application Ser. No. 358,907 filed Apr. 29, 1929, now Patent No. 1,795,053, and as to this subject matter the present application is a continuation-in-part.

It will of course be understood by those skilled in the art that various changes may be made from the two specific embodiments of the invention disclosed herein without departing from the spirit thereof as set forth in the appended claims.

I claim:—

1. A battery booster system comprising, in combination, a battery, a booster generator in series with said battery and having fields of opposed polarity and through which current flows in only one direction at all times, and a relay control adapted to vary the excitation of one field upon increase of line voltage and to vary the excitation of the other field upon decrease of line voltage.

2. The combination set forth in claim 1 further characterized in that said fields are shunt fields.

3. The combination set forth in claim 1 further characterized in that said fields are adapted to be simultaneously excited so as to neutralize each other when line voltage is substantially normal.

4. The combination set forth in claim 1 further characterized in that said fields are shunt fields adapted to be simultaneously excited so as to neutralize each other when line voltage is substantially normal.

5. The combination set forth in claim 1 further characterized in that said relay control includes resistances adapted to be successively inserted in the circuit for one of said fields and a pair of vibrating relays for controlling the insertion of said resistances in accordance with a variation of line voltage from normal.

6. The combination set forth in claim 1 further characterized in that said relay control includes resistances adapted to be successively inserted in the circuit of each field, and a pair of vibrating relays for each field circuit, one pair of relays being operative upon a decrease of line voltage and the other pair being operative upon an increase of line voltage.

7. The combination set forth in claim 1 further characterized in that said relay control includes resistances adapted to be successively inserted in the circuit of each field, and a pair of vibrating relays for each field circuit, one pair of relays being operative upon a decrease of line voltage and the other pair being operative upon an increase of line voltage, said pairs of relays being so relatively adjusted that when one pair is operative the other is inoperative.

8. The combination set forth in claim 1 further characterized in that said fields are shunt fields of opposed polarity and are adapted to be simultaneously excited when line voltage is substantially normal, while said relay control includes resistances adapted to be successively inserted in the circuit of each field, and a pair of vibrating relays for each field circuit, one pair of relays being operative upon a decrease of line voltage and the other pair being operative upon an increase of line voltage.

9. The combination set forth in claim 1 further characterized in that resistance is provided for the circuit of each field while the relay control includes a vibrating relay, one for each of said field circuits, and each relay being adapted to control its respective resistance in accordance with an increase or decrease of line voltage.

10. The combination set forth in claim 1 further characterized in that said relay control includes a variable current controlling means adapted to be variably inserted in the circuit of one of said fields, and relay mechanism for controlling the insertion of said current controlling means in accordance with a variation of line voltage from a predetermined normal value.

11. The combination set forth in claim 1 further characterized in that said relay control includes current resisting elements adapted to be successively inserted in the circuit of each field, and a pair of voltage responsive means for controlling the insertion of said resisting elements in accordance with a variation of line voltage from normal.

12. A battery booster system comprising, in combination, a battery, a booster generator connected in series with said battery to control the charging and discharging thereof to thereby effect stabilization of the line voltage, said generator being provided with two shunt fields of opposed polarity and adapted to be simultaneously supplied with current, and means to control the excitation of said fields in accordance with variations in line voltage.

13. The combination set forth in claim 12 further characterized by the provision of a series field for said generator.

CHESTER F. STRONG.